United States Patent [19]

Yamamura

[11] Patent Number: 4,817,760
[45] Date of Patent: Apr. 4, 1989

[54] DISPLACEMENT DETECTING MECHANISM FOR HYDRAULIC CIRCUIT OF FORK LIFT

[75] Inventor: Naoki Yamamura, Kariya, Japan

[73] Assignee: Kabushiki Kaisha Toyoda Jidoshokki Seisakusho, Kariya, Japan

[21] Appl. No.: 888,822

[22] Filed: Jul. 22, 1986

[30] Foreign Application Priority Data

Jul. 30, 1985 [JP]  Japan .............................. 60-117643[U]

[51] Int. Cl.[4] ................................................ B66B 9/20
[52] U.S. Cl. ....................................... 187/9 R; 74/491
[58] Field of Search .................... 187/9 R, 9 E, 17, 28; 180/213, 214; 74/491; 414/630, 628; 307/112; 137/625.66, 625.64; 251/14

[56] References Cited

U.S. PATENT DOCUMENTS

| 2,320,601 | 6/1943 | Howell | 414/630 |
| 3,014,344 | 12/1961 | Arnot | 187/9 R |
| 4,133,511 | 1/1979 | Hartmann | 137/487.5 |
| 4,332,177 | 6/1982 | Andresen | 74/491 |
| 4,364,412 | 12/1982 | Peters | 137/625.66 |
| 4,585,024 | 4/1986 | Esseniyi | 137/625.66 |
| 4,627,468 | 12/1986 | Wilke et al. | 74/491 |

FOREIGN PATENT DOCUMENTS

| 1236154 | 7/1960 | France . |
| 00519 | 11/1981 | United Kingdom . |
| 2102511 | 2/1983 | United Kingdom . |

Primary Examiner—Joseph J. Rolla
Assistant Examiner—Kenneth Noland
Attorney, Agent, or Firm—Brooks Haidt Haffner & Delahunty

[57] ABSTRACT

Herein disclosed is a displacement detecting mechanism for a hydraulic circuit of a fork lift, which comprises: at least one loading lever of said fork lift; at least one hydraulic control valve adapted to be operated by the loading lever, said hydraulic control valve having at least one spool adapted to be actuated by the loading lever; and at least one chopper controlling linear stroke type variable resistor for detecting the displacement of the spool, the variable resistor being attached directly to the hydraulic control valve.

4 Claims, 2 Drawing Sheets

FIG. 1
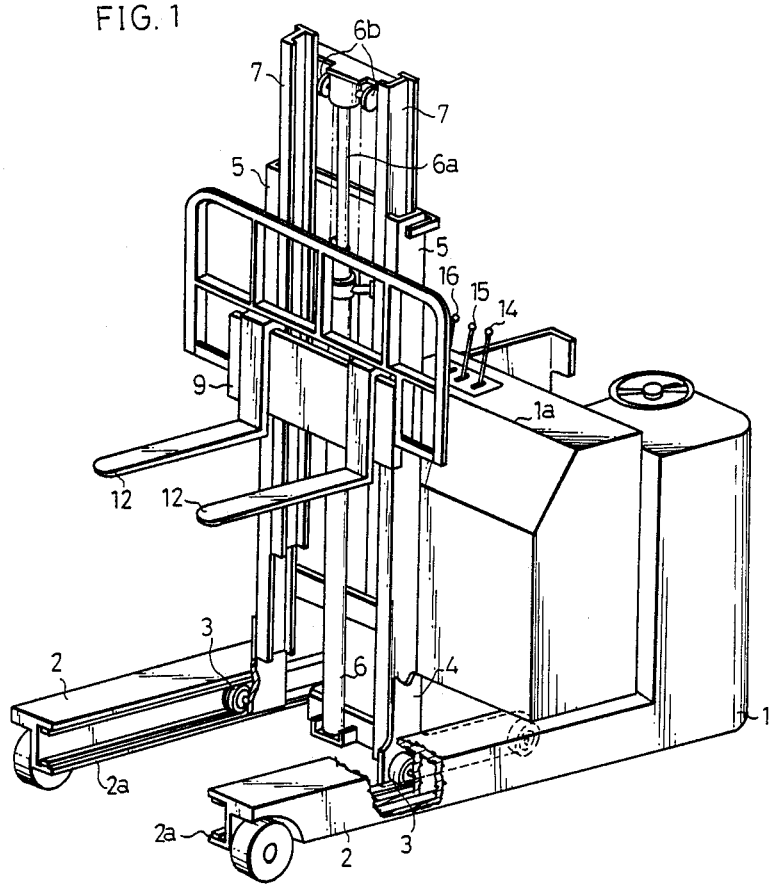
FIG. 2
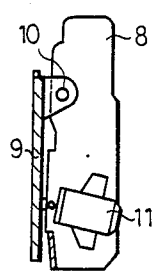
FIG. 5

DISPLACEMENT DETECTING MECHANISM FOR HYDRAULIC CIRCUIT OF FORK LIFT

BACKGROUND OF THE INVENTION

1. Field of the Invention

The present invention relates to a detection mechanism for detecting the displacement of the hydraulic circuit of a fork lift and, more particularly, to a displacement detecting mechanism for detecting the displacement of a hydraulic circuit in a loading chopper control.

2. Description of the Related Art

In case the operation angle of a loading lever of a fork lift is detected by a sensor so that the loading speed may be subjected to a chopper control in accordance with a detection signal corresponding to the operation angle outputted from that sensor, it belongs to the related art to actuate the sensor through a link mechanism like the accelerator of a counter vehicle.

As described above, however, since the link mechanism is used in the related art for actuating the sensor, a large space for and a large number of parts are required for the link mechanism so that they exert severe restrictions on the layout of the fork lift body.

SUMMARY OF THE INVENTION

It is, therefore, an object of the present invention to provide a displacement detecting mechanism which has a simplified construction for detecting the displacement of a hydraulic circuit.

Another object of the present invention is to provide a hydraulic circuit displacement detecting mechanism which can provide high reliability and reduce error factors such as looseness.

In order to achieve the above-specified objects, according to the present invention, there is provided a displacement detecting mechanism for a hydraulic circuit of a fork lift, which comprises, at least one loading lever of said fork lift; at least one hydraulic control valve adapted to be operated by said loading lever, said hydraulic control valve having at least one spool adapted to be actuated by said loading lever; and at least one chopper controlling linear stroke type variable resistor for detecting the displacement of said spool, said variable resistor being attached directly to said hydraulic control valve.

The other objects of the present invention will become apparent if the embodiment thereof to be described hereinafter is practised, as will be defined by the appended claims. Moreover, a number of advantages left untouched herein will occur to those skilled in the art if the present invention is put into practice.

BRIEF DESCRIPTION OF THE DRAWINGS

FIG. 1 is a perspective view showing a reach type battery fork lift embodying the present invention;

FIG. 2 is a longitudinal section showing a lift bracket of the same embodiment in a state that a fork bracket is hinged thereto;

FIG. 3 is a front elevation showing the same; and

FIG. 5 is a block diagram showing an electric circuit.

DESCRIPTION OF THE PREFERRED EMBODIMENT

Figure 4:
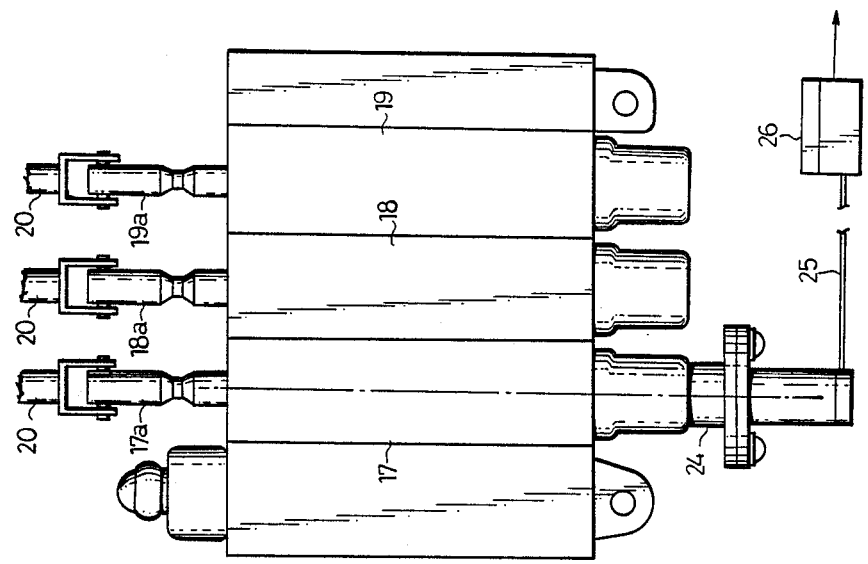
FIG. 4 is a front elevation showing the same.

One preferred embodiment, in which the present invention is embodied in a reach type battery fork lift, will be described in the following with reference to FIGS. 1 to 5.

The reach type battery fork lift has its body 1 equipped at its lower portion with a pair of reach legs 2 which are formed with guide rails 2a on their sides extending longitudinally and opposed to each other. From the two sides of a mast carriage 4 having carriage rollers 3 which are capable of rolling along the guide rails 2a, there are erected upright a pair of outer masts 5, which interpose an erected lift cylinder 6 at their center.

On the outer masts 5, there are borne inner masts 7 which are moved upward and downward by the rod 6a of the lift cylinder 6. On the inner masts 7, there are borne lift brackets 8 (as shown in FIG. 2) which can be moved upward and downward through lift rollers (although not-shown) so that they can be elevated and lowered through chains which are made to run on pulleys 6b attached to the leading end portions of the rod 6a. To the lift bracket 8, there is so hinged through a pin 10 a fork bracket 9 that it can be tilted by the action of a tilt cylinder 11. A pair of forks 12 are so fixed to the fork bracket 9 that they can be transversely adjusted.

At the driver's stand side of a body frame 1a, on the other hand, there are hinged through a bracket 13 loading levers such as a lift lever 14, a reach lever 15 and a tilt lever 16. Below these operating levers 14, 15 and 16, respectively, there are fixed to the frame 1a lifting, reaching and tilting hydraulic control valves 17, 18 and 19 which extend vertically. These control valves 17, 18 and 19 are connected through hoses to an oil pump (although not shown), which is adapted to be driven by a loading motor 23 so that they supply the working oil discharged from the aforementioned oil pump to the lift cylinder 6, the reach cylinder (although not shown) the tilt cylinder 11, respectively, in accordance with the openings of spools 17a, 18a and 19a which are attached to the upper ends of the hydraulic control valves 17, 18 and 19, respectively. Incidentally, those spools 17a, 18a and 19a can move in the longitudinal directions of the respective control valves. Moreover, the respective spools 17a, 18a and 19a of the control valves 17, 18 and 19 have their upper end portions connected through connecting rods 20 to the respective lower end portions of the levers 14, 15 and 16 so that they can be operated by the levers 14, 15 and 16, respectively.

At one side of each of the spools 17a, 18a and 19a, there is arranged a limit switch (although only the lifting limit switch 22 is shown), which is fixed through a bracket 21 above the corresponding one of the hydraulic control valves 17, 18 and 19. If the respective levers 14, 15 and 16 are turned forward, moreover, the spools 17a, 18a and 19a are moved downward through the connecting rods 20 so that actuators 22a of the limit switches 22 are turned on by the spools 17a, 18a and 19a to start the loading motor 23 thereby to generate a hydraulic pressure.

A potentiometer 24 acting as a linear stroke type variable resistor is attached directly to the lower end of the lifting hydraulic control valve 17. If the spool 17a of this control valve 17 is moved downward, a built-in plunger (although not shown) is pushed so that the potentiometer 24 detects the displacement of the spool 17a. This potentiometer 24 is connected with a control circuit 27 through a harness 25 and a connector 26 which is disposed in a predetermined position. That control circuit 27 controls the r.p.m. of the loading motor 23, when it receives the detection signal detected by the potentiometer 24, in accordance with that detection signal.

The operations of the displacement detecting mechanism thus constructed will be described in the following.

Now, if the lift lever 14 is turned forward, the spool 17a is moved down through the connecting rod 20 to open the lifting control valve 17. Simultaneously with this, the actuator 22a of the limit switch 22 is turned on by the displacement of that spool 17a to start the loading motor 23 thereby to generate the hydraulic pressure.

On the other hand, the displacement of the spool 17a is detected by the potentiometer 24, and the control circuit 27 controls the r.p.m. of the loading motor 23 in accordance with the detection signal outputted from that potentiometer 24. In accordance with the operation stroke (or angle) of the lift lever 14, more specifically, the potentiometer 24 detects the operation stroke (or angle) so that the r.p.m. of the loading motor 23 is controlled on the basis of that operation stroke (or angle). As a result, the working oil to be supplied to the lift cylinder 6 is controlled to subject the loading speed to the chopper control.

Incidentally, the present invention should not be limited to the embodiment thus far described but can be embodied in the following manners'.

(1) In the foregoing embodiment, the linear stroke type variable resistor is attached directly to the lower portion of the reaching control valve 18 or the tilting control valve 19;

(2) In the foregoing embodiment, the linear stroke type variable resistor is attached directly to the lower portion of each of the control valves 17, 18 and 19;

(3) The linear stroke type variable resistor is attached directly to the lower portion of the lifting control valve 17 or the tilting control valve 19 of not the reach type battery fork lift but another fork lift; and (4) The potentiometer 24 is replaced by another linear stroke type variable resistor.

As has been described hereinbefore, according to the present invention, since no link mechanism is required for actuating the sensor, as is different from the related art, the construction is simplified. Since the control circuit can be connected through the harness, moreover, spacial restrictions are drastically eliminated. Since the displacements of the control valves are detected directly by means of the linear stroke type variable resistor, still moreover, there can be attained another effect that the reliability can be enhanced while reducing the error factors such as the looseness.

Since it is apparent to make a wide variety of modifications without departing from the spirit and scope of the present invention, the present invention should not be limited to its specified embodiment except that it is defined by the appended claims.

What is claimed is:

1. A displacement detecting mechanism for a hydraulic circuit of a fork lift, comprising: at least one spool type hydraulic control valve having a valve housing and a longitudinal valve spool passing through said housing between first and second sides of said housing, a fork lift loading lever operably coupled to a first end of said valve spool at said first side of said housing for controlling the longitudinal position of said valve spool within said valve housing, means responsively coupled to said loading lever for starting a loading motor to generate hydraulic pressure upon actuation of said loading lever, and a linear stroke type variable resistor for controlling a motor speed control circuit the loading motor, said variable resistor having a body part joined to said housing at said second side of said housing, and having a positionable slider, said slider being coupled responsively to a second end of said valve spool at said second side of said housing for detecting the displacement of said valve spool.

2. A displacement detecting mechanism according to claim 1, wherein said linear stroke variable resistor is a potentiometer.

3. A displacement detecting mechanism for a hydraulic circuit of a fork lift, comprising: at least one spool type hydraulic control valve having a valve housing and a longitudinal valve spool passing through said housing between first and second sides of said housing, a fork lift loading lever operably coupled to a first end of said valve spool at said first side of said housing for controlling the longitudinal position of said valve spool within said valve housing, a linear stroke type potentiometer for controlling a motor speed control circuit, said potentiometer having a body part joined to said housing at said second side of said housing, and having a positionable slider, said slider being coupled responsively to a second end of said valve spool at said second side of said housing for detecting the displacement of said valve spool, and at least one switch coupled responsively to said first end of said valve spool and turned on or off by the movement of said spool for starting a loading motor to generate a hydraulic pressure when it is turned on.

4. A displacement detecting mechanism according to claim 3, wherein said fork lift is of the reach type, and said one hydraulic control valve is a lift control valve; and wherein a reach control valve and a tilt control valve are joined to said lift control valve, and reach and tilt levers are provided coupled drivingly respectively to said reach and tilt control valves.

* * * * *

UNITED STATES PATENT AND TRADEMARK OFFICE
CERTIFICATE OF CORRECTION

PATENT NO. : 4,817,760
DATED      : April 4, 1989
INVENTOR(S): N. Yamamura

It is certified that error appears in the above-identified patent and that said Letters Patent is hereby corrected as shown below:

Column 1, line 41, after "comprises", change comma "," to colon --:--.

Figure 3:
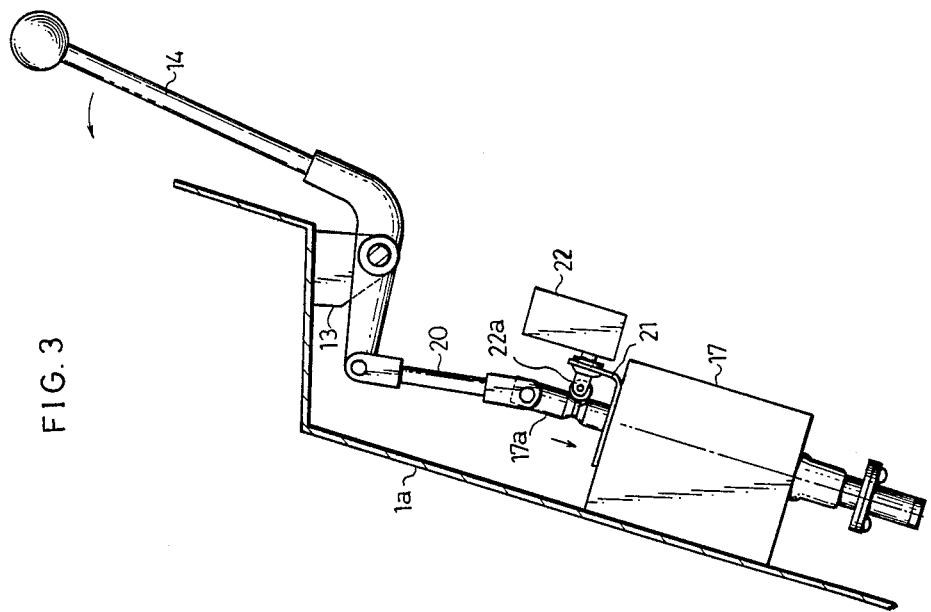
FIG. 3 is a section showing a portion of the operating controls of the same.

Column 1, line 66, delete line "FIG. 3 is a front elevation showing the same; and".

Column 3, line 32, after "manners", change comma "," to colon --:--.

Column 4, line 19 after "circuit" insert --of--.

Signed and Sealed this

Ninth Day of January, 1990

*Attest:*

JEFFREY M. SAMUELS

*Attesting Officer*   *Acting Commissioner of Patents and Trademarks*